United States Patent
Yamamura et al.

(10) Patent No.: US 12,189,802 B2
(45) Date of Patent: Jan. 7, 2025

(54) DEVICE INFORMATION MANAGEMENT SYSTEM

(71) Applicant: FANUC CORPORATION, Yamanashi (JP)

(72) Inventors: Masato Yamamura, Yamanashi (JP); Takahiro Kouji, Yamanashi (JP); Daisuke Suzuki, Yamanashi (JP); Yuusaku Nishimura, Yamanashi (JP); Ken Miyawaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 204 days.

(21) Appl. No.: 18/040,892

(22) PCT Filed: Sep. 6, 2021

(86) PCT No.: PCT/JP2021/032711
§ 371 (c)(1),
(2) Date: Feb. 7, 2023

(87) PCT Pub. No.: WO2022/054767
PCT Pub. Date: Mar. 17, 2022

(65) Prior Publication Data
US 2023/0315887 A1    Oct. 5, 2023

(30) Foreign Application Priority Data
Sep. 11, 2020 (JP) .................. 2020-152540

(51) Int. Cl.
G06F 21/62    (2013.01)

(52) U.S. Cl.
CPC ................. *G06F 21/6218* (2013.01)

(58) Field of Classification Search
CPC ................. G06F 21/6218; G06F 21/70
See application file for complete search history.

(56) References Cited

U.S. PATENT DOCUMENTS

| 2004/0210796 A1* | 10/2004 | Largman | G06F 11/1469 |
| | | | 714/E11.133 |
| 2006/0253342 A1* | 11/2006 | Endo | G06Q 30/0621 |
| | | | 705/26.7 |

(Continued)

FOREIGN PATENT DOCUMENTS

| JP | 2001-331556 A | 11/2001 |
| JP | 2008-016012 A | 1/2008 |
| JP | 2018-147012 A | 9/2018 |

OTHER PUBLICATIONS

English translation for "Decision to Grant a Patent" for Japanese Patent Application No. 2021-573288, 2 pages, drafted: Feb. 25, 2022. (Year: 2022).*

(Continued)

*Primary Examiner* — Ponnoreay Pich
(74) *Attorney, Agent, or Firm* — Studebaker & Brackett PC

(57) ABSTRACT

Provided is a device information management system capable of preventing unnecessary information disclosure to competitors. A device information management system according to one aspect of the present disclosure is a system for managing information about a device configured by combining a plurality of components supplied from different suppliers, and comprises: a configuration information storage unit that stores, for each device, configuration information including a device ID identifying the device, component IDs identifying the components incorporated in the device, and hierarchical information indicating a hierarchical relationship between the components of the device; a component data storage unit that stores, for each of the components, component data including the device ID of the component, supplier information identifying a supplier of the component, one or a plurality of pieces of technical information about the component, and permission informa- (Continued)

tion specifying the scope of permission to view the technical information in the relationship between the components of the device; and an access management unit that determines, on the basis of the hierarchical information and the permission information, if the technical information can be viewed.

5 Claims, 1 Drawing Sheet

(56) References Cited

U.S. PATENT DOCUMENTS

| | | | |
|---|---|---|---|
| 2008/0208381 A1* | 8/2008 | Soga | G06Q 10/06 |
| | | | 700/110 |
| 2009/0077106 A1* | 3/2009 | Kawase | H05K 13/085 |
| 2021/0385069 A1* | 12/2021 | Reid | G06F 21/32 |

OTHER PUBLICATIONS

Kumokiri et al., "Distributed Software Repository with Access Scope Concept", Lecture Notes/Software Studies 19—Foundations of Software Engineering IV, First Edition, Dec. 20, 1997, pp. 131-134.

International Search Report issued in PCT/JP2021/032711; mailed Nov. 22, 2021.

* cited by examiner

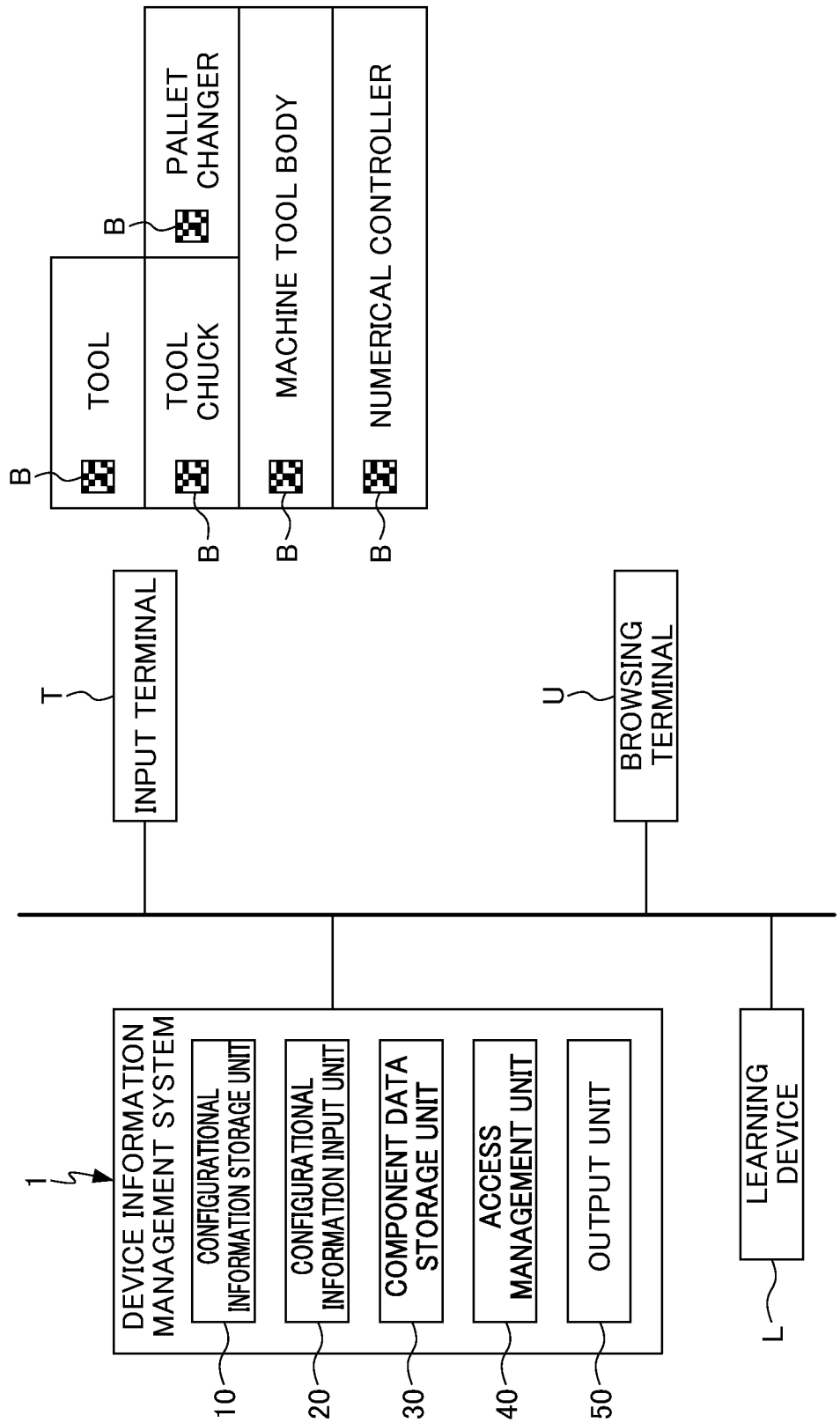

DEVICE INFORMATION MANAGEMENT SYSTEM

TECHNICAL FIELD

The present invention relates to a device information management system.

BACKGROUND ART

Various devices (which may be a single piece of equipment, or a system, facility, etc. including a plurality pieces of equipment) can be made up of a combination of a plurality of components (which may be a piece of equipment capable of functioning alone) supplied from different suppliers (including manufacturers, system integrators, intermediary dealers, etc.). When a failure occurs in such a device, or when a change in specification of such a device is needed, it may be necessary to collect technical information regarding the components from the component suppliers in order to organize effective measures.

It is extremely troublesome to obtain the technical information regarding each of components from multiple suppliers. To address this, a system has been proposed in which information regarding components is provided via a network, and access to the technical information is managed by means of IDs and passwords assigned to users (for example, see Patent Document 1).

Patent Document 1: Japanese Unexamined Patent Application, Publication No. 2001-331556

DISCLOSURE OF THE INVENTION

Problems to be Solved by the Invention

In a case of constructing a system for providing technical information regarding components via a network, the suppliers of the components are required to register necessary technical information in a server. However, there are many cases in which the suppliers of different components included in the same device are in competition with each other, and the technical information of one supplier is not disclosed to the competitor. Accordingly, it is expected that the technical information will not be provided sufficiently. Under the circumstances described above, there is a demand for a device information management system capable of preventing unnecessary information disclosure to a competitor.

Means for Solving the Problems

One aspect of the present disclosure is directed to a device information management system for managing information regarding a device made up of a combination of a plurality of components supplied from different suppliers. The device information management system includes: a configurational information storage unit configured to store, on a device-by-device basis, configurational information regarding the device, the configurational information including a device ID for identifying the device, component IDs for identifying the components incorporated in the device, and hierarchical information indicating a superior-subordinate relationship between the components in the device; a component data storage unit configured to store component data regarding each component, the component data including a device ID, supplier information specifying a supplier of the component, one or more pieces of technical information regarding the component, and permission information specifying, in terms of a relationship between the components in the device, an extent to which the technical information is permitted to be browsed; an access management unit configured to determine whether or not to permit browsing of the technical information, based on the hierarchical information and the permission information.

Effects of the Invention

The device information management system according to one aspect of the present disclosure is capable of preventing unnecessary information disclosure to a competitor.

BRIEF DESCRIPTION OF THE DRAWINGS

FIG. 1 is a block diagram illustrating a configuration of a device information management system according to an embodiment of the present disclosure.

PREFERRED MODE FOR CARRYING OUT THE INVENTION

Embodiments of the present disclosure will be described with reference to the drawings. FIG. 1 is a block diagram illustrating a configuration of a device information management system 1 according to an embodiment of the present disclosure.

The device information management system 1 manages information regarding a device made up of a combination of a plurality of components supplied from different suppliers. The device information management system 1 includes a configurational information storage unit 10, a configurational information input unit 20, a component data storage unit 30, an access management unit 40, and an output unit 50. The device information management system 1 can be implemented by causing one or more computers having a storage device (a memory, a disk drive, etc.) and an arithmetic device (a CPU, etc.) to execute an appropriate program. The constituent elements of the device information management system 1 are distinguishable according to their functions, and do not have to be clearly distinguishable in terms of physical configuration and program configuration.

The configurational information storage unit 10 stores, on a device-by-device basis, configurational information regarding a device, and the configurational information includes a device ID for identifying the device, a component IDs for identifying components incorporated in the device, and hierarchical information indicating a superior-subordinate relationship between the components. Preferably, the configurational information further includes a code or the like for identifying an end user of the device.

The device ID and the component ID can be specified by means of, for example, a board B attached to each component. Examples of the board B includes an IC tag, a two-dimensional bar code, etc. Each board B is issued by an administrator of the device information management system 1 or prepared according to a management guideline established by the administrator of the device information management system 1, and has uniqueness. The boards B may be color coded to indicate, for example, the supplier, the type of component, etc.

It is possible to use, as the device ID, the component ID of a main component of the device. Specifically, for example, in a case where the device is a machine tool, a numerical controller may be defined as the main component, while a machine tool body, a tool exchanger, a tool, a workpiece handling device, and the like may be defined as other components. Alternatively, the machine tool body may be defined as the main component. For identification of the main component, the boards E attached to the components may be additionally provided with discriminant means such as color codes and character information displayed thereon. A model number, a serial number, and the like assigned to each component by the supplier may be utilized as the device ID and the component ID.

The hierarchical information enables the components of the device to be represented in the form of a tree structure, and may be hierarchization of the components on the basis of units for component exchange. Here, the hierarchization is illustrated with a machine tool as an example. A machine tool body is an upper component, a tool chuck, a pallet changer, and the like mounted to the machine tool body are lower components relative to the machine tool body, and a tool mounted to the tool chuck is a lower component relative to the tool chuck. Further, a program is also interpreted as a component, and the program for a numerical controller is a lower component relative to the numerical controller.

The configurational information can be written in a markup language such as XML in the following manner, which is a non-limiting example.

Example of Configurational Information

```
<?xml version="1.0" encoding="UTF-8" ?>
<ID id="12345">
  <Device deviceId="99999" parentDeviceId="-1"
    corporationId="3333" comment="machine manufacturer">
    <BaseInfo comment="Basic Information"
      deviceType="machining center" modelName="MC-ABCDEFG"
      serialNo="SN10000" />
  </Device>
  <Device deviceId="10100" parentDeviceId="99999"
    corporationId="4444" comment="CNC manufacturer ">
    <BaseInfo comment="Basic Information"
      deviceType="CNC" modelName="CNC-HIJK111"
      modelNo="CNC10000" serialNo="SN999-999" />
    <AddInfo comment="additional information">
      <PartsInfo addInfoId="1000">
        <Parts modelName="Unit1" modelNo="PN34567-1"
      serialNo="SN34567-1" />
        <Parts modelName="Unit2" modelNo="PN34567-2"
      serialNo="SN34567-2" />
      </PartsInfo>
      <SoftInfo addInfoId="1001">
        <Soft modelName="Soft1" modelNo="PN34567-3"
      serialNo="SN34567-3" />
      </SoftInfo>
    </AddInfo>
  </Device>
</ID>
```

The configurational information storage unit 10 may generate, for each device, data indicating only a superior-subordinate relationship between the component IDs, i.e., data indicating only a tree structure for the components, on a device-by-device basis. Generating such information allows for simplification of processing performed by the access management unit 40, which will be described later.

In the above configurational information, a tag starting with "Device" is followed by "deviceId" indicating the component of interest and "parentDeviceId" indicating a parent component, thereby representing the superior-subordinate relationship between the components. The characters "parentDeviceId"=−1 mean that the component of interest is at the uppermost level in the device. Further, since "corporationId" indicating the ID uniquely identifying the supplier and "comment" indicating a type of the supplier are written, the outline of the configuration of the device can be grasped from the configurational information alone. It is possible to omit "corporationId" and "comment". Even if the ID and the like of the supplier is omitted, these pieces of information can be checked by referring to the component data storage unit 30, which will be described later.

The configurational information includes not only a tag for basic information starting with "BaseInfo", but also a tag for additional information starting with "AddInfo". "BaseInfo" indicates an item that is ordinarily disclosed to a counterparty, to whom the disclosure is permitted according to access control, which will be described later. "AddInfo" indicates an item for which disclosure or nondisclosure can be selected depending on the counterparties. While the information indicated by "AddInfo" may be omitted, the information can be checked by referring to the component data storage unit 30 to be described later.

The configurational information input unit 20 generates configurational information upon receiving, via a network, information borne on the board B attached to each component, and thereby stores the generated configurational information in the configurational information storage unit 10. Storing of the configurational information by the configurational information input unit 20 includes not only addition of new configurational information but also updating existing configurational information.

Input to the configurational information input unit 20 is performed using an input terminal T capable of reading information borne on the board B. The input terminal T may be implemented by, for example, a tablet PC, or the like having an appropriate application program loaded therein. The input terminal T may be operable to read, according to a screen display, a board B (board B attached to the uppermost component) to thereby identify the device ID, a board B (board B attached to a component to which a component to be registered is mounted) to thereby identify the component ID of an upper component directly connected, and a board B of the component to be registered to thereby identify the component ID of the component to be registered. The input terminal T inputs the read device ID and component IDs to the configurational information input unit 20 via the network. The input terminal T may further be configured to prompt the user to input information borne on a nameplate or the like of a component, for example, the component name, the model, the serial number, etc. Furthermore, the configurational information input unit 20 may receive the component ID of an arbitrary component of an existing device transmitted from the input terminal T, and may identify the device ID of a device to which a component is to be newly mounted, by referring to the information stored in the configurational information storage unit 10. In this case, the tree structure of the components of the existing device may be displayed such that the user can easily identify an upper component to be directly connected.

The component data storage unit 30 stores component data regarding each component, and the component data includes a device ID, supplier information specifying the supplier of the component, one or more pieces of technical information regarding the component, and permission information specifying, in terms of a relationship between the components in the device, an extent to which the technical information is permitted to be browsed. Preferably, the component data stored in the component data storage unit 30 further includes special viewer information, such as a code, that specifies a viewer who is permitted to browse the technical information of the component regardless of the relationship between the components in the device.

The supplier information is a code or the like that identifies the supplier. The supplier is not limited to a manufacturer, and may include a trading company, a system vendor, etc. Therefore, the component data of one component may include a plurality pieces of supplier information.

The technical information may include optional information, such as design information of the component, a user's manual, maintenance information, backup data, and the like. Since the technical information tends to have a large data size, if technical information of components of the same type is redundantly stored, the storage area will be unnecessarily consumed. To address this, the technical information may be written in a format such as a link to data in a separate storage area.

The permission information indicates an extent of components in the component tree structure, and permits the supplier of the component to browse the technical information. It is preferable that the permission information includes information that separately specifies browsing permission for the supplier of an upper component and browsing permission for the supplier of a lower component, in terms of the series relationship between the components. Preferably, the permission information further includes information indicating whether or not the end user is permitted to browse the information.

The special viewer information is optionally set, and specifies a special viewer who is specially permitted to browse the technical information regardless of the tree structure of the components. For example, it is conceivable to designate, as the special viewer, a group company or the like with which the information needs to be shared closely.

As the component data of a component, the following data items, which are non-limiting examples, may be stored.

Examples of Component Data

Data item: Data
Component ID: 1655
Supplier code: 4444
Component classification: CNC
Serial number: GH05 . . .
Model: A02B- . . .
Browsing permission for end user: YES
Number of upper levels within browsing permission: 2
Number of lower levels within browsing permission: 1
Special viewer code: 1234; 5678
Technical Information Link: ¥¥strage¥ . . . , . . .

In the component data exemplified above, permission information includes: the "browsing permission for end user" for setting whether or not to permit an end user to browse the technical information of the component interest; the "number of upper levels within browsing permission" and the "number of lower levels within browsing permission" that separately indicate, as the number of upper levels and the number of lower levels, an extent of upper components and lower components which are selected from the components in series relationship with the component of interest and whose suppliers are permitted to browse the technical information of the component; and the "special viewer code". Thus, the above component data indicates that browsing permission is given to the following parties: the end user, the suppliers of the component(s) of the next upper level, the component(s) of the next but one upper level, and the component(s) of the next lower level in terms of the serial relationship in the device, and the person identified by the special viewer code representing a special viewer.

When a viewer sends a request for accessing the technical information of a specific device by means of, for example, a browsing terminal U connected to the device information management system 1 via a network, the access management unit 40 determines whether or not to permit the viewer to browse the technical information of each of the components, based on the hierarchical information regarding the requested device and the permission information regarding the components incorporated in the requested device. Specifically, the access management unit 40 specifies, according to the permission information included in the component data of the component subjected to determination, the component ID(s) of a component(s) for which browsing permission can be given, and permits the viewer to browse the technical information of the component(s) if the supplier of the component(s) is identified as the viewer. In a case where a viewer is an end user of the device, the access management unit 40 permits the viewer to browse the technical information of a component that is within end user browsing permission according to the permission information.

The output unit 50 outputs the configurational information and the component data to a learning device L connected to the device information management system 1 via, for example, a network. The learning device L may be configured to predict a failure of each component from usage of the component, on the basis of information provided from the device information management system 1, operation information of the device provided from the device, and the like. The learning device L may be configured to predict demand for the components based on the foregoing information.

As described above, the device information management system 1 can set a viewer who is permitted to browse the technical information on a component-by-component basis, thereby making it possible to prevent unnecessary information disclosure to competitors. As result, the suppliers of components are allowed to use with security the device information management system 1, and necessary information can be provided to the suppliers and the end users.

Due to widespread use of the device information management system 1, even when a supplied component is resold, the supplier will be able to locate the destination of the resold component.

The device information management system 1 can also be used to prompt an end user or a supplier to perform preventive maintenance (planned maintenance).

While the embodiments of the present disclosure have been described above, the present disclosure is not limited thereto. Further, the effects described in the above embodiments are merely examples of the most preferred effects provided by the present disclosure, and the effects of the present disclosure are not limited to those described in the above-described embodiments.

The device information management system according to the present disclosure may be configured to set an extent of components for which browsing permission is given, in respect of each of a plurality of pieces of technical information regarding the same component. Here, a description is given on the analogy of the embodiment described above. The device information management system may be provided with a plurality of sets each composed of the end user browsing permission, the number of upper levels within browsing permission, the number of lower levels within browsing permission, and the special viewer code, and may be capable of selecting which of the sets should be applied for each piece of technical information, thereby limiting a target within browsing permission in the case of particularly important technical information.

EXPLANATION OF REFERENCE NUMERALS

1: Device Information Management System
10: Configurational Information Storage Unit
20: Configurational Information Input Unit
30: Component Data Storage Unit
40: Access Management Unit
50: Output Unit
B: Board
T: Input Terminal
U: Browsing Terminal

The invention claimed is:

1. A device information management system for managing information regarding a device made up of a combination of a plurality of components supplied from different suppliers, the device information management system comprising:
  a configurational information storage unit configured to store, on a device-by-device basis, configurational information regarding the device, the configurational information including a device ID for identifying the device, component IDs for identifying the components incorporated in the device, and hierarchical information indicating a superior-subordinate relationship between the components in the device;
  a component data storage unit configured to store component data regarding each component, the component data including a component ID, supplier information specifying a supplier of the component, one or more pieces of technical information regarding the component, and permission information specifying, in terms of a relationship between the components in the device, an extent to which the technical information is permitted to be browsed; and
  an access management unit configured to determine whether or not to permit browsing of the technical information, based on the hierarchical information and the permission information.

2. The device information management system according to claim 1, wherein
  the components include an upper component and a lower component, and
  the permission information separately specifies browsing permission for a supplier of the upper component and browsing permission for a supplier of the lower component.

3. The device information management system according to claim 1, wherein
  the component data further incudes a special viewer information specifying a viewer who is permitted to browse the technical information of the component regardless of the relationship between the components.

4. The device information management system according to claim 1, further comprising:
  a configurational information input unit configured to generate the configurational information upon receiving, via a network, information borne on a board attached to each component, and to thereby store the configurational information in the configurational information storage unit.

5. The device information management system according to claim 1, further comprising:
  an output unit configured to output the configurational information and the component data to a learning device.

* * * * *